2,972,528
DIPYRIDYL DERIVATIVES AND HERBICIDAL METHODS AND COMPOSITIONS CONTAINING THE SAME

Robert Coles Brian, George William Driver, Ronald Frederick Homer, and Richard Lewis Jones, all of Manchester, England, assignors to Imperial Chemical Industries Limited, London, England, a corporation of Great Britain No Drawing. Filed Mar. 25, 1957, Ser. No. 647,958

Claims priority, application Great Britain Apr. 4, 1956

18 Claims. (Cl. 71—2.5)

This invention relates to a treatment process and more particularly it relates to a process for the treatment of vegetation.

According to the invention we provide a process for the treatment of growing vegetation which comprises applying to the said growing vegetation, a herbicidal composition comprising as active ingredient at least one compound of the formula:

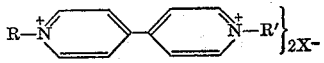

wherein R and R', which may be the same or different, stand for alkyl radicals of not more than 4 carbon atoms which may optionally be substituted and X stands for an anionic radical, in such an amount that the said vegetation is substantially severely damaged or destroyed.

As stated above the alkyl radicals (R and R') may optionally be substituted and as particular substituents there may be mentioned for example halogen, hydroxyl, carboxyl, alkoxy, carboalkoxy, carbamyl or N-substituted carbamyl and di- or tri-substituted amino groups. As particularly useful compounds there may be mentioned for example 4,4'-dipyridyl dimethiodide, 4,4'-dipyridyl dimethobromide, 4,4'-dipyridyl dimethochloride, 4,4'-dipyridyl dimethylmethosulphate, 4,4'-dipyridyl diethiodide, 4,4'-dipyridyl di-β-hydroxyethobromide, 4,4'-dipyridyl dicarboxymethochloride, 4,4'-dipyridyl-di-β-chloroethobromide, 4,4'-dipyridyl dicarboethoxymethochloride, 4,4'-dipyridyl di-(β-carboxyethochloride), 4,4'-dipyridyl di(γ-carboethoxypropobromide) and 4,4'-dipyridyl di-(N,N-diethylcarbamylmethochloride).

We are aware that certain of the compounds of the above stated formula are known compounds for example 4,4'-dipyridyl dimethiodide, dimethochloride, dimethobromide, dimethylmethosulphate, diethiodide, diethochloride, diethylethosulphate, di-n-propiodide, di-n-propochloride, di-n-propobromide, diisobutiodide, di-carboxymethochloride and 4,4'-dipyridyl-N-methiodide-N'-n-propiodide.

The said herbicidal compositions may conveniently be applied to growing vegetation in the form of an aqueous solution of the one or more compounds of the formula stated above. Such aqueous solution may advantageously contain also additional ingredients known to the art for example a wetting agent and/or a humectant.

Suitable wetting agents may be for example a condensation product of ethylene oxide with for example an alkyl phenol for example octylcresol such that the said condensation product contains one molecular proportion of octyl cresol condensed with about 8–10 molecular proportions of ethylene oxide.

The humectant in the said herbicidal compositions is beneficial in that for example it prevents evaporation of low volume sprays and it aids in the penetration of the active ingredient into the plant. Suitable humectants may be for example calcium chloride, glycerol, ethylene glycol and water soluble polyethylene glycols.

The said aqueous solutions may also contain additional ingredients for example agents which improve the adhering properties of the said aqueous solutions to the plant for example sodium carboxymethylcellulose and ammonium polymethacrylate.

The said herbicidal compositions may also be conveniently applied to growing vegetation in the form of dusts wherein the active ingredient may be admixed with an inert pulverulent diluent for example talc, china clay, gypsum or basic slag.

The said herbicidal compositions may also contain additional active ingredients which are known herbicidal agents, for example they may contain weed killers of the hormone type for example they may contain chlorophenoxyacetic acids for example 2,4-dichlorophenoxyacetic acid, 2,4,5-trichlorophenoxyacetic acid, 2-methyl-4-chlorophenoxyacetic acid and/or the corresponding 2,4-dichloro-, 2,4,5-trichloro- and 2-methyl-4-chloro-γ-phenoxybutyric acids.

According to a further feature of the invention we provide new herbicidal aqueous compositions comprising as active ingredient at least one compound of the formula:

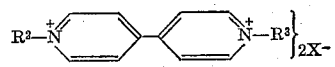

wherein $R^2$ and $R^3$, which may be the same or different, stand for alkyl radicals of not more than 4 carbon atoms or for carboxymethyl radicals and X stands for an anionic radical, in the presence of a wetting agent and/or a humectant.

Suitable wetting agents may be for example a condensation product of ethylene oxide with for example an alkyl phenol for example octylcresol such that the said condensation product contains one molecular proportion of octylcresol condensed with about 8–10 molecular proportions of ethylene oxide.

The humectant in the said herbicidal compositions is beneficial in that for example it prevents evaporation of low volume sprays and it aids in the penetration of the active ingredient into the plant. Suitable humectants may be for example calcium chloride, glycerol, ethylene glycol and water soluble polyethylene glycols.

The said new herbicidal aqueous compositions may also contain additional ingredients for example agents which improve the adhering properties of the said aqueous solutions to the plant for example sodium carboxymethylcellulose and ammonium polymethacrylate.

The said herbicidal aqueous compositions may also contain additional active ingredients which are known herbicidal agents, for example they may contain weed killers of the hormone type for example they may contain chlorophenoxyacetic acids for example 2,4-dichlorophenoxyacetic acid, 2,4,5-trichlorophenoxyacetic acid, 2-methyl-4-chlorophenoxyacetic acid and/or the corresponding 2,4-dichloro-, 2,4,5-trichloro- and 2-methyl-4-chloro-γ-phenoxybutyric acids and/or the salts thereof.

As stated above, certain of the compounds of the above stated formula are known compounds. The remaining compounds of the above stated formula are new compounds.

Thus according to a further feature of the invention we provide new compounds of the formula:

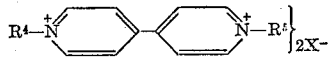

wherein $R^4$ and $R^5$, which may be the same or different, stand for substituted alkyl radicals of not more than 4 carbon atoms and X stands for an anionic radical, provided that $R^4$ and $R^5$ do not stand for carboxymethyl radicals.

As particularly useful compounds, we prefer those compounds of the formula stated above wherein $R^4$ and R⁵, which as said may be the same or different, stand for alkyl radicals of not more than 4 carbon atoms which are substituted by one or more halogens, hydroxyl, carboxyl, alkoxy, carboalkoxy, carbamyl or N-substituted carbamyl, di- or tri-substituted amino groups and wherein X stands for an anionic radical.

Particular preferred compounds are for example 4,4'-dipyridyl di-β-hydroxyethobromide, 4,4'-diphyridyl di-β-chloroethobromide, 4,4'-dipyridyl di-β-ethoxy-ethiodide, 4,4'-dipyridyl di-carboethoxymethochloride, 4,4'-dipyridyl di-(β-carboxyethochloride, 4,4'-dipyridyl di-(γ-carboethoxypropobromide) and 4,4'-dipyridyl di-(N,N-diethylcarbamylmethochloride).

According to a further feature of the invention we provide a process for the manufacture of the said new compounds which comprises quaternising either 4,4'-dipyridyl or a 4,4'-dipyridyl monoquaternary salt.

The said process may be carried out in the presence of an inert diluent or solvent for example acetone, a lower aliphatic alcohol for example methanol or ethanol or nitrobenzene. Suitable quaternising agents may be for example ethylene bromohydrin, β-ethoxyethyl iodide, ethyl chloroacetate, β-chloropropionic acid, ethyl γ-bromobutyrate and N,N-diethylchloroacetamide. The reaction may be accelerated or completed by the action of heat.

According to a further feature of the invention we provide a process for the manufacture of those of the said new compounds wherein R⁴ and/or R⁵ stands for an alkyl radical containing one or more halogen atoms which comprises halogenating the corresponds compounds wherein R⁴ and/or R⁵ stands for an alkyl radical containing one or more hydroxyl groups.

As a suitable halogenating agent there may be mentioned for example thionyl chloride and the reaction may be accelerated or completed by the action of heat.

According to a further feature of the invention we provide new herbicidal compositions wherein the active ingredient is at least one of the said new compounds.

As particularly suitable new compounds there may be mentioned for example 4,4'-dipyridyl di-β-hydroxyethobromide, di-β-chlorethobromide, di-β-ethoxyethoidide, di-carboethoxymethochloride, di-β-carboxyethochloride, di-γ-carboethoxypropobromide and di-(N,N'-diethylcarbamylmethchloride).

The said new herbicidal compositions may be in the form of aqueous solutions which may optionally contain one or more wetting agents and/or one or more humectants.

Suitable wetting agents may be for example condensation products of ethylene oxide with for example an alkyl phenol for example octylcresol such that the said condensation products contain one molecular proportion of actylcresol condensed with about 8–10 molecular proportions of ethylene oxide.

The humectant in the said herbicidal compositions is benefical in that for example it prevents evaporation of low volume sprays and its aids in the penetration of the active ingredient into the plant. Such humectants may be for example calcium chloride, glycerol, ethylene glycol and water soluble polyethylene glycols.

The said aqueous solutions may also contain additional ingredients for example agents which improve the adhering properties of said aqueous solutions to the plant for example, sodium carboxymethylcellulose or ammonium polymethacrylate.

The said new herbicidal compositions may also be in the form of dusts wherein the active ingredient may be admixed with an inert pulverulent diluent for example talc, china clay, gypsum or basic slag.

The said new herbicidal compositions may also contain additional active ingredients which are known herbicidal agents for example they may contain weed-killers of the hormone type for example they may contain chlorophenoxyacetic acids for example 2,4-dichlorophenoxyacetic acid, 2,4,5-trichlorophenoxyacetic acid and 2-methyl-4-chlorophenoxyacetic acid and/or the corresponding 2,4-dichloro-, 2,4,5-trichloro- and 2-methyl-4-chloro-γ-phenoxybutyric acids and/or the salts thereof.

The compounds with which this invention is concerned are valuable herbicidal agents for the treatment of growing vegetation for example they are effective in the form of the herbicidal compositions described above in bringing about severe damage to or complete destruction of for example potato haulm, chickweed (*Stellaria media*), speedwell (*Veronica chamaedrys*), fat hen (*Chenopodium album*), orache (*Atriplex patula*), black bindweed (*Polygonum convolvulus*), weed grasses (Poa spp.), marigold (*Calendula officinalis*), wild red clover (*Trifolium pratense*), cleavers (*Galium aparine*), mustard (*Brassica alba*), nettle (*Urtica urens*) and the tops of creeping thistle (*Cirsium arvense*), field convolvulus (*Convolvulus arvensis*) and hawkweed (*Picris hieracioides*).

The invention is illustrated but not limited by the following examples in which the parts are by weight:

Example 1

Ten parts of 4,4'-dipyridyl hydrate and 50 parts of ethylene bromohydrin are heated under reflux during 16 hours. The reaction mixture is then filtered and the solid residue is washed with acetone. It is crystallised from methanol containing a little water to give 4,4'-dipyridyl di-β-hydroxyethobromide as a colourless crystalline solid, M.P. 281° C. with decomposition.

Example 2

Seven parts of 4,4'-dipyridyl di-β-hydroxyethobromide prepared as described in Example 1 is added to 25 parts of thionyl chloride. The reaction mixture is then heated under reflux during 90 minutes and the excess thionyl chloride is then removed by distillation. The residue is ground with 40 parts of acetone and the mixture is filtered. The solid residue is decolourised by boiling with 50 parts of water and 1 part of carbon, filtering, and evaporating the filtrate to dryness. The residue so obtained is crystallised from a mixture of acetic acid and acetone to give 4,4'-dipyridyl di-β-chloroethobromide as a colourless crystalline solid, M.P. above 350° C.

Example 3

A mixture of 5 parts of β-ethoxyethyl iodide and 1.6 parts of 4,4'-dipyridyl hydrate is heated at 140° C. during 10 hours. The reaction mixture is then cooled, triturated with 20 parts of acetone and the mixture filtered. The solid residue is crystallised from ethanol to give 4,4'-dipyridyl di-β-ethoxyethoiodide as an orange-red crystalline solid which becomes very dark red on exposure to the air and has M.P. 218–220° C.

Example 4

A mixture of 4 parts of 4,4'-dipyridyl hydrate and 20 parts of ethylchloroacetate is boiled during 5 minutes. The hot reaction mixture is poured into 160 parts of acetone and the mixture is filtered. The solid residue so obtained is 4,4'-dipyridyl di-carboethoxymethochloride as a hygroscopic solid.

Example 5

A mixture of 3.9 parts of 4,4'-dipyridyl hydrate and 10 parts of β-chloropropionic acid is heated to 130° C. and is then kept at 150–160° C. until the exothermic reaction ceases. It is then kept at 140–150° C. during 15 minutes and is then cooled. The solid product is ground up with acetone and the suspension so obtained is filtered. The solid residue is washed with acetone and there is thus obtained 4,4'-dipyridyl di-(β-carboxyethochloride), M.P. 314° C. with decomposition.

Example 6

A mixture of 5 parts of 4,4'-dipyridyl hydrate and 20 parts of ethyl γ-bromobutyrate is heated at 150–160° C. during 30 minutes. The reaction mixture is then poured into 100 parts of acetone and the suspension is filtered. The solid residue is dissolved in hot ethanol, the solution is treated with charcoal and is then diluted with ether. The mixture is filtered and the solid residue consists of 4,4'-dipyridyl di-(γ-carboethoxypropobromide), M.P. 216–218° C.

*Example 7*

A mixture of 3.3 parts of 4,4'-dipyridyl hydrate and 10 parts of N,N-diethylchloroacetamide is heated at 135–140° C. during 15 minutes. The reaction mixture is then triturated with acetone and the suspension so obtained is filtered. There is thus obtained 4,4'-dipyridyl di-(N,N-diethylcarbamylmethochloride) as a hygroscopic powder, M.P. 296° C.

*Example 8*

A mixture of 15 parts of 4,4'-dipyridyl dihydrate and 90 parts of α-iodo-γ-cyclotetramethyleneaminopropane hydriodide is heated at 130–140° C. during 12 hours. The reaction mixture is then cooled and 30 parts of acetone are added. The mixture is filtered and the solid residue is crystallised from ethanol containing a little water to give 4,4'-dipyridyl di-(γ-cyclotetramethyleneaminopropiodide) dihydriodide.

*Example 9*

A mixture of 17.6 parts of 4,4'-dipyridyl dihydrate, 53 parts of γ-bromopropyltrimethylammonium bromide and 100 parts of nitrobenzene is heated at 150° C. during 6 hours. The reaction mixture is then cooled, the bulk of the nitrobenzene is decanted off and the residue is triturated with 200 parts of acetone and the mixture is then filtered. The solid residue is dissolved in 50 parts of boiling methanol, the solution clarified with carbon and filtered and the filtrate is treated with 100 parts of acetone and filtered. There is thus obtained N,N'-bis-(γ-trimethylammoniumpropyl)-4,4'-dipyridylium tetrabromide, M.P. 290° C. with decomposition.

*Example 10*

A mixture of 1 part of 4,4'-dipyridyl dimethiodide, 1 part of the condensation product obtained from one molecular proportion of octylcresol and about 8–10 molecular proportions of ethylene oxide and 1000 parts of water is applied as a spray at a rate of 100 gallons to the acre to a mixed stand of seedling plants. Within 7 days, the treatment gives complete kill of wheat (*Triticum vulgare*), sugar beet (*Beta vulgaris*), marigold (*Calendula officinalis*) and red clover (*Trifolium pratense*) and causes serious damage to cleavers (*Galium aparine*).

*Example 11*

When the 4,4'-dipyridyl dimethiodide used as starting material in the process as described in Example 10 is replaced by one part of 4,4'-dipyridyl diethiodide it is likewise found that the treatment gives complete kill of wheat (*Triticum vulgare*), sugar beet (*Beta vulgaris*), marigold (*Calendula officinalis*) and red clover (*Trifolium pratense*) and causes serious damage to cleavers (*Galium aparine*).

*Example 12*

A mixture of 1 part of 4,4'-dipyridyl dimethiodide, 0.33 part of the condensation product obtained from one molecular proportion of octylcresol and about 8–10 molecular proportions of ethylene oxide, 340 parts of glycerol and 58 parts of water is applied as a spray at the rate of 5 gallons per acre on a mixed stand of seedling plants. Within 7 days the treatment gives complete kill of wheat (*Triticum vulgare*), marigold (*Calendula officinalis*) and sugar beet (*Beta vulgaris*) and causes serious damage to red clover (*Trifolium pratense*).

*Example 13*

A mixture of 1 part of 4,4'-dipyridyl di-β-hydroxy-ethobromide, 2 parts of the condensation product obtained from one molecular proportion of octylcresol and about 8–10 proportions of ethylene oxide and 2000 parts of water is applied as a spray at a rate of 100 gallons to the acre to a mixed stand of seedling plants. Within 7 days, the treatment gives complete kill of wheat (*Triticum vulgare*), mustard (*Brassica alba*), marigold (*Calendula officinalis*) and lettuce (*Lactuca sativa*), and causes severe damage to nettle (*Urtica urens*), sugar beet (*Beta vulgaris*), red clover (*Trifolium pratense*) and cleavers (*Galium aparine*).

*Example 14*

A mixture of 1 part of 4,4'-dipyridyl dicarboxymethochloride, 1 part of the condensation product obtained from one molecular proportion of octylcresol and about 8–10 proportions of ethylene oxide, and 1000 parts of water is applied as a spray at a rate of 100 gallons to the acre to a mixed stand of seedling plants. Within 7 days the treatment gives complete kill of wheat (*Triticum vulgare*), marigold (*Calendula officinalis*), sugar beet (*Beta vulgaris*), red clover (*Trifolium pratense*) and cleavers (*Galium aparine*).

When the 4,4'-dipyridyl di-carboxymethochloride used as starting material in the process as described above is replaced by 1 part of 4,4'-dipyridyl di-carboethoxymethochloride, it is likewise found that the treatment gives complete kill of wheat (*Triticum vulgare*), marigold (*Calendula officinalis*), sugar beet (*Beta vulgaris*), red clover (*Trifolium pratense*) and cleavers (*Galium aparine*).

*Example 15*

A mixture of 1 part of 4,4'-dipyridyl di-β-ethoxy-ethiodide, 0.5 part of the condensation product obtained from one molecular proportion of octylcresol and 8–10 proportions of ethylene oxide and 500 parts of water is applied as a spray at a rate of 100 gallons to the acre to a mixed stand of seedling plants. Within 7 days, the treatment causes severe damage to wheat (*Triticum vulgaris*), marigold (*Calendula officinalis*), mustard (*Brassica alba*) and sugar (*Beta vulgaris*) and completely kills red clover (*Trifolium pratense*).

*Example 16*

A mixture of 1 part of 4,4'-dipyridyl di-β-chloroethobromide, 1 part of the condensation product obtained from one molecular proportion of octylcresol and about 8–10 proportions of ethylene oxide and 1000 parts of water is applied as a spray at a rate of 100 gallons to the acre to a mixed stand of seedling plants. Within 7 days the treatment gives a complete kill of wheat (*Triticum vulgare*), sugar beet (*Beta vulgaris*), marigold (*Calendula officinalis*), red clover (*Trifolium pratense*) and causes severe damage to cleavers (*Galium aparine*).

*Example 17*

A mixture of 1 part of 4,4'-dipyridyl dimethiodide, 0.33 part of the condensation product obtained from one molecular proportion of octylcresol and about 8–10 molecular proportions of ethylene oxide and 200 parts of water is applied as a spray at a rate of 20 gallons per acre onto a crop of potatoes. A complete destruction of the pototo haulm resulted within 10 days and there was a complete kill of the following weeds: chickweed (*Stellaria media*), speedwell (*Veronica chamaedrys*), fat hen (*Chenopodium album*), orache (*Atriplex patula*), black bindweed (*polygonum convolvulus*) and weed grasses (*Poa spp.*) and the tops of creeping thistle (*Cirsium arvense*), field convolvulus (*Convolvulus arvensis*) and hawkweed (*Picris hieracioides*).

We claim:

1. A process for the treatment of growing vegetation which comprises applying to the said growing vegetation, a herbicidal composition comprising as active ingredient at least one compound of the formula:

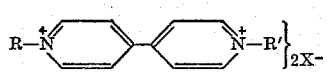

wherein R and R' are alkyl radicals of not more than four carbon atoms and X is an anionic radical, in such an amount that the said vegetation is at least substantially severely damaged.

2. The process of claim 1 wherein said compound is 4,4'-dipyridyl dimethiodide.

3. The process of claim 1 wherein said compound is 4,4'-dipyridyl dimethobromide.

4. The process of claim 1 wherein said compound is 4,4'-dipyridyl dimethochloride.

5. The process of claim 1 wherein said compound is 4,4'-dipyridyl-dimethylmethosulphate.

6. Process as claimed in claim 1 wherein the said herbicidal composition is applied to growing vegetation in the form of an aqueous solution.

7. Process as claimed in claim 1 wherein the said herbicidal composition is applied to growing vegetation in the form of a dust wherein the active ingredient is admixed with an inert pulverulent diluent.

8. Process as claimed in claim 7 wherein the inert pulverulent diluent is selected from the group consisting of talc, china clay, gypsum and basic slag.

9. The compound 4,4'-dipyridyl di-β-hydroxyethobromide.

10. The compound 4,4'-dipyridyl di-β-chloroethobromide.

11. The compound 4,4'-dipyridyl di-β-ethoxyethiodide.

12. The compound 4,4'-dipyridyl di-carboethoxymethochloride.

13. The compound 4,4'-dipyridyl di-(β-carboxyethochloride).

14. The compound 4,4'-dipyridyl di-(γ-carboethoxypropobromide).

15. The compound 4,4'-dipyridyl di-(N,N-di-ethylcarbamylmethochloride).

16. A process for the treatment of growing vegetation which comprises applying to the said growing vegetation, a herbicidal composition comprising as active ingredient at least one compound of the formula:

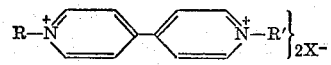

wherein R and R' are substituted alkyl radicals of not more than 4 carbon atoms, said radicals being substituted with at least one member of the group consisting of: halogen, hydroxyl, carboxyl, lower alkoxy, carbo-lower alkoxy, carbamyl, di-lower alkyl-N:N-substituted carbamyl tertiary and quaternary lower alkyl ammonium and cyclotetramethylene ammonium groups; and X is an anionic radical, in such amount that the said vegetation is at least substantially severely damaged.

17. A compound of the formula:

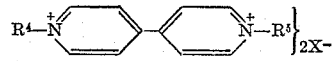

wherein $R^4$ and $R^5$ are substituted alkyl radicals containing not more than 4 carbon atoms substituted with a member of the group consisting of halogen, hydroxyl, carboxyl, lower alkoxy, carbo-lower alkoxy, carbamyl, di-lower alkyl-N:N-substituted carbamyl, tertiary and quaternary lower alkyl ammonium and cyclotetramethylene ammonium groups; and X is an anionic radical.

18. A herbicidal composition comprising, as the essential active ingredient, at least one compound according to claim 17, and a herbicdial carrier therefor.

References Cited in the file of this patent
UNITED STATES PATENTS

| | | |
|---|---|---|
| 2,284,002 | Lontz | May 26, 1942 |
| 2,321,736 | DuPuis et al. | June 15, 1943 |
| 2,624,734 | Goldberg et al. | Jan. 6, 1953 |
| 2,655,446 | Todd | Oct. 13, 1953 |
| 2,709,648 | Ryker et al. | May 31, 1955 |
| 2,722,478 | Olin | Nov. 1, 1955 |
| 2,734,815 | Mowry et al. | Feb. 14, 1956 |

OTHER REFERENCES

Frear in "Catalogue of Insecticides and Fungicides," vol. 1, page 156 (1948).

Emmert et al. in "Chemical Abstracts," vol. 17, col. 1237, vol. 25, col. 5426.